United States Patent

Huang

[11] Patent Number: 6,085,645
[45] Date of Patent: Jul. 11, 2000

[54] ICE CREAM MAKING APPARATUS

[76] Inventor: Olivia Huang, No. 2, Lane 403, Sec. 3, Chun-Shan Rd., Wu-Jih Hsiang, Taiching Hsien, Taiwan

[21] Appl. No.: 09/413,706

[22] Filed: Oct. 6, 1999

[51] Int. Cl.[7] .............................. A23L 1/00; A23G 9/00; B01F 7/00; B01F 7/16

[52] U.S. Cl. .............................. 99/455; 99/348; 99/452; 62/342; 366/144; 366/149; 366/192

[58] Field of Search .............................. 99/348, 452–460; 62/342, 343, 306, 308, 136; 366/144–149, 163, 169, 279, 320, 324, 192–196

[56] References Cited

U.S. PATENT DOCUMENTS

| | | | |
|---|---|---|---|
| 568,769 | 10/1896 | Katz | 62/68 |
| 1,742,878 | 1/1930 | Rosenberg | 366/251 X |
| 2,607,566 | 8/1952 | Saunders | 366/149 X |
| 4,497,580 | 2/1985 | Doyel | 366/251 X |
| 4,664,529 | 5/1987 | Cavalli | 99/455 X |
| 4,696,166 | 9/1987 | Bukoschek et al. | 62/343 X |
| 4,802,407 | 2/1989 | Negri et al. | 99/453 |
| 4,838,702 | 6/1989 | Torimitsu et al. | 62/342 X |
| 5,013,158 | 5/1991 | Tarlow | 99/348 X |
| 5,031,518 | 7/1991 | Bordes | 366/601 X |
| 5,106,199 | 4/1992 | Eckel et al. | 366/147 X |
| 5,201,263 | 4/1993 | Teng | 99/348 X |
| 5,372,422 | 12/1994 | Dubroy | 99/348 X |
| 5,497,695 | 3/1996 | Canela | 366/249 X |
| 5,516,208 | 5/1996 | Givant | 366/251 |
| 5,549,042 | 8/1996 | Bukoschek et al. | 99/455 |
| 5,676,463 | 10/1997 | Larsen | 366/251 |
| 5,711,602 | 1/1998 | Rohring et al. | 366/251 |

*Primary Examiner*—Timothy Simone
*Attorney, Agent, or Firm*—Trop, Pruner & Hu, P.C.

[57] ABSTRACT

An ice cream making apparatus includes a container having a bottom opening for passage of ice cream, and a discharging mechanism mounted on the container below the bottom opening and adapted to discharge ice cream out of the container. The discharging mechanism has a hollow guide which is mounted on the container and which defines a passageway therein for communication with the bottom opening, a gate member disposed underneath the passageway and mounted slidably on the hollow guide for moving in a transverse direction across the passageway to seal the passageway, and a linkage mechanism pivotally mounted on the hollow guide for rotating about an axis to manipulate movement of the gate member in the transverse direction.

7 Claims, 6 Drawing Sheets

ICE CREAM MAKING APPARATUS

BACKGROUND OF THE INVENTION

1. Field of the Invention

This invention relates to an ice cream making apparatus, more particularly to an ice cream making apparatus having a discharging mechanism for discharging ice cream.

2. Description of the Related Art

FIGS. 1 and 2 illustrate a conventional ice cream making apparatus. The apparatus includes a stand 11 with an outer container 111 mounted thereon. An inner container 12 is received inside and is supported by the outer container 111. An agitator 15 is disposed inside the inner container 12, and is connected to a driving unit 14. The inner container 12 has a threaded bottom outlet 121 with a hollow first joint 122 mounted thereon. An extruding screw portion 151 extends downwardly from the agitator 15 into the first joint 122 for extruding ice cream out of the inner container 12. A gate member 16 is mounted slidably on a hollow second joint 163 which is coupled with the first joint 122. The hollow second joint 163 has an opening 161 for passage of ice cream. The gate member 16 is formed as an elongated plate having a pair of slide guides 162 mounted slidably on a pair of rails provided on the second joint 163, an aperture 164 disposed between the guides 162, a planar part 165 adjacent to and aligned with the aperture 164 along the plate, and a handling part 166 for moving the gate member 16 between an opened position in which the aperture 164 is aligned with the opening 161 of the second joint 163 so as to permit ice cream to exit through the aperture 164, and a closed position in which the planar part 165 covers the opening 161 of the second joint 163 so as to prevent ice cream from exiting through the aperture 164.

Since the gate member 16 abuts tightly against the second joint 163 for preventing ice cream from leaking, a relative large friction force has to be overcome in order to move the gate member 16 between the opened and closed positions. With the handling part 166 being formed as a part of the gate member 16, such friction force can increase the difficulty in manipulating the movement of the gate member 16. Moreover, since the gate member 16 is only supported on one end by the second joint 163, a straight movement of the gate member 16 between the opened and closed positions can not be guaranteed. As a result, the moving of the gate member 16 between the opened and closed positions can become troublesome.

SUMMARY OF THE INVENTION

Therefore, it is an object of the present invention to provide an ice cream making apparatus that is capable of overcoming the disadvantages described above.

Accordingly, an ice cream making apparatus comprises: a container having a bottom opening for passage of ice cream; and a discharging mechanism mounted on the container below the bottom opening and adapted to discharge ice cream out of the container, the discharging mechanism having a hollow guide which is mounted on the container and which defines a passageway therein for communication with the bottom opening, a gate member disposed underneath the passageway and mounted slidably on the hollow guide for moving in a transverse direction across the passageway to seal the passageway, and a linkage mechanism pivotally mounted on the hollow guide for rotating about an axis to manipulate movement of the gate member in the transverse direction.

BRIEF DESCRIPTION OF THE DRAWINGS

In drawings which illustrate an embodiment of the invention.

DETAILED DESCRIPTION OF THE PREFERRED EMBODIMENT

Figure 1:
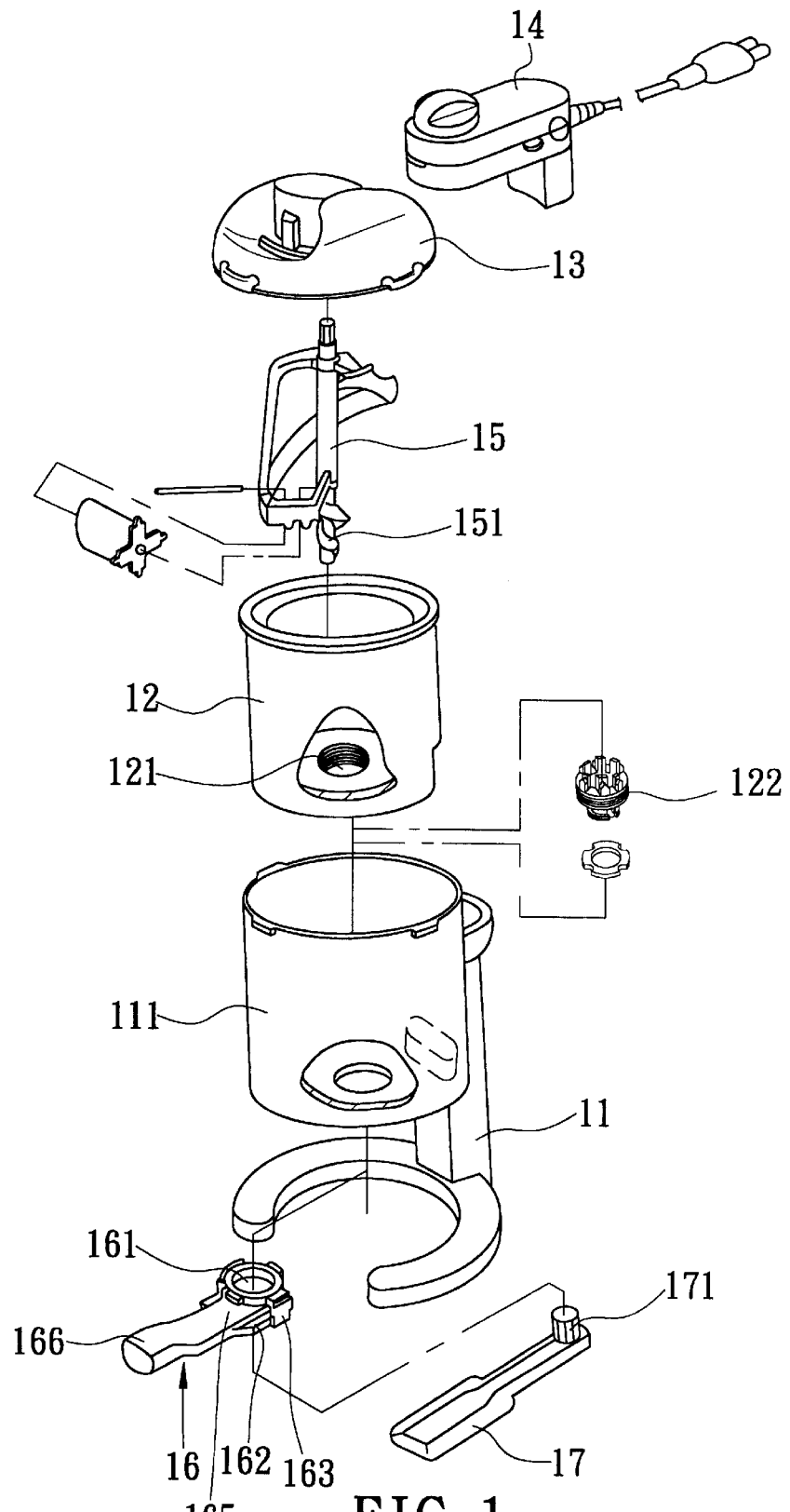
FIG. 1 is an exploded view of a conventional ice cream making apparatus.
Figure 2:
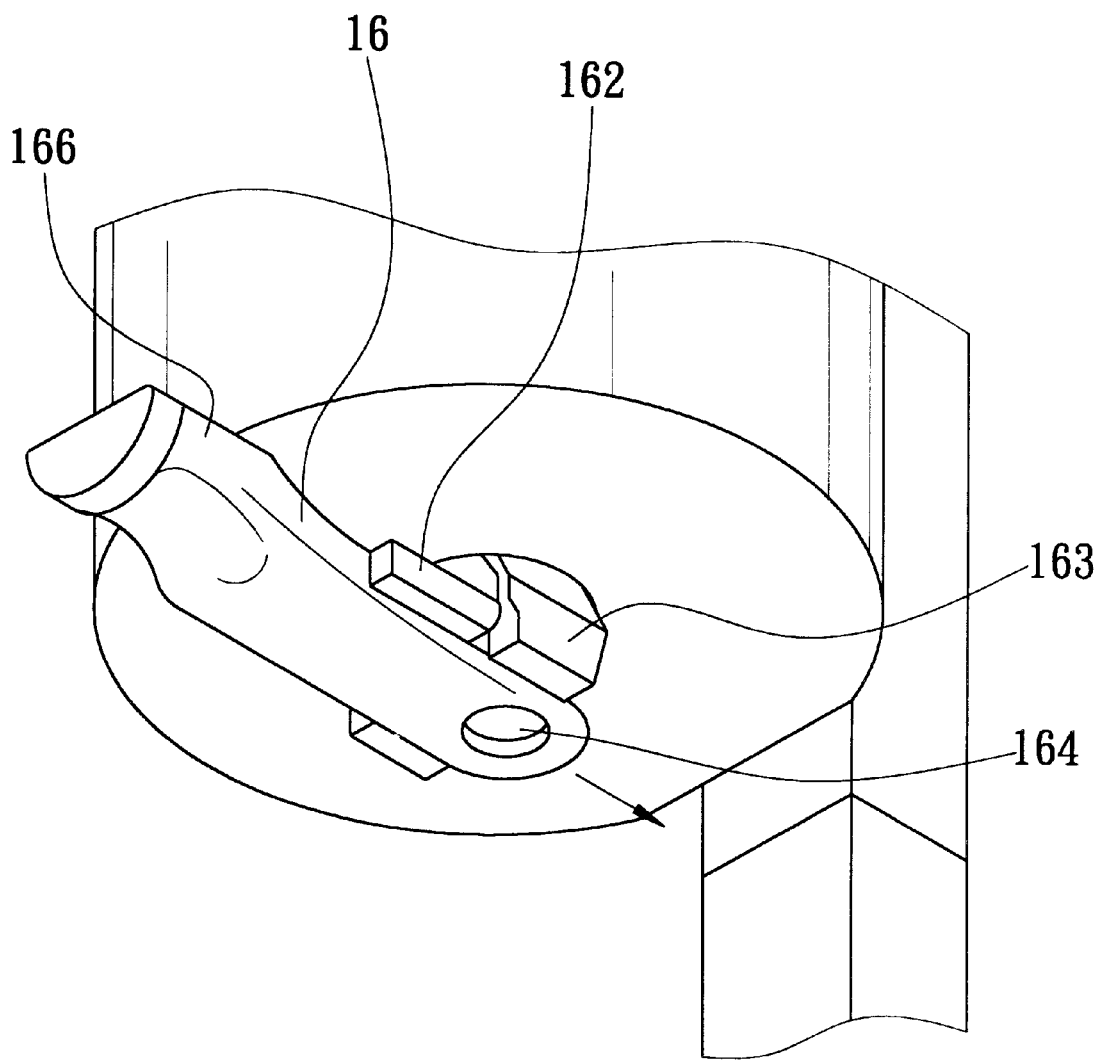
FIG. 2 is a fragmentary bottom view of the ice cream making apparatus of FIG. 1.
Figure 3:
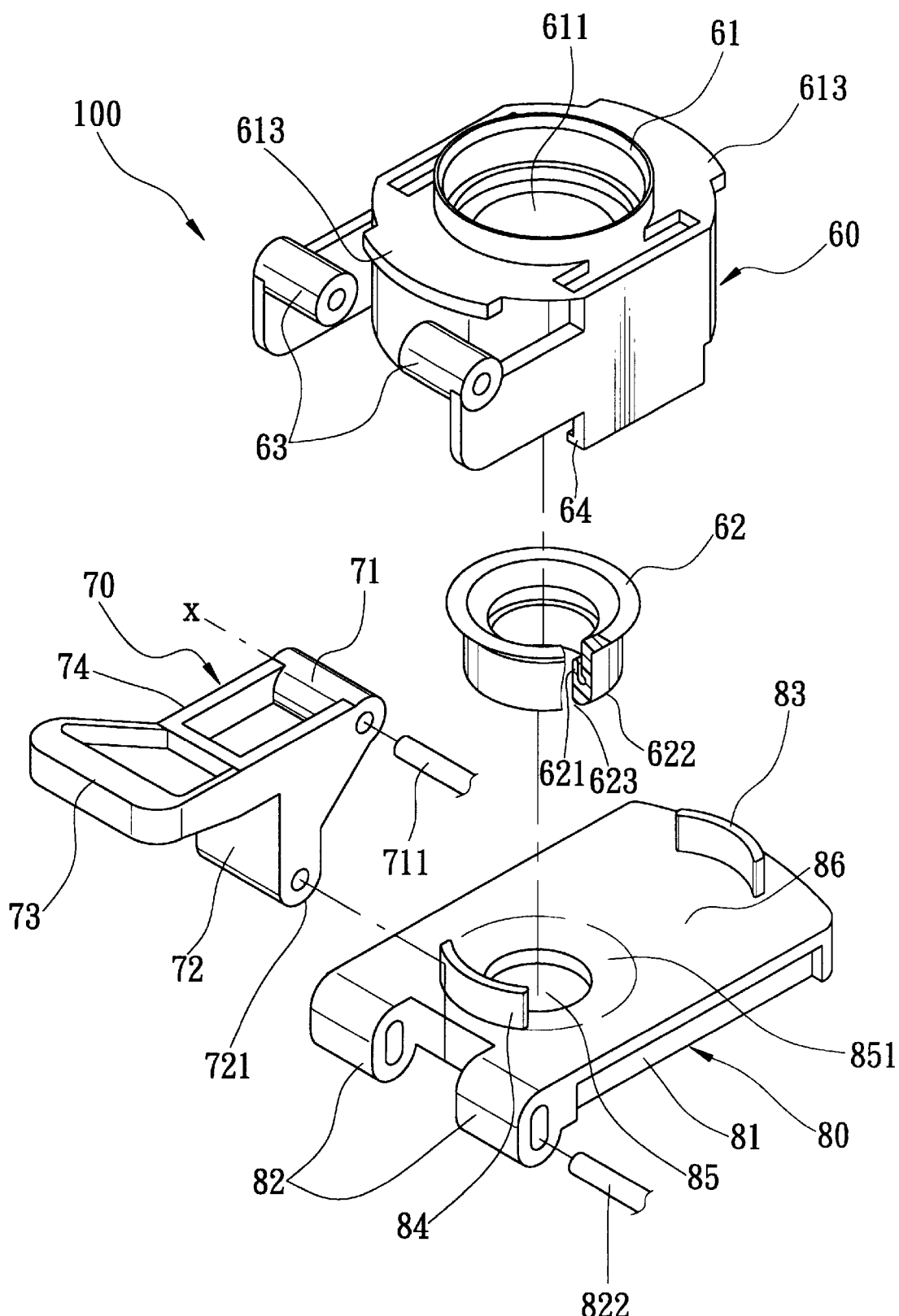
FIG. 3 is a fragmentary exploded view of an ice cream making apparatus embodying this invention.
Figure 4:
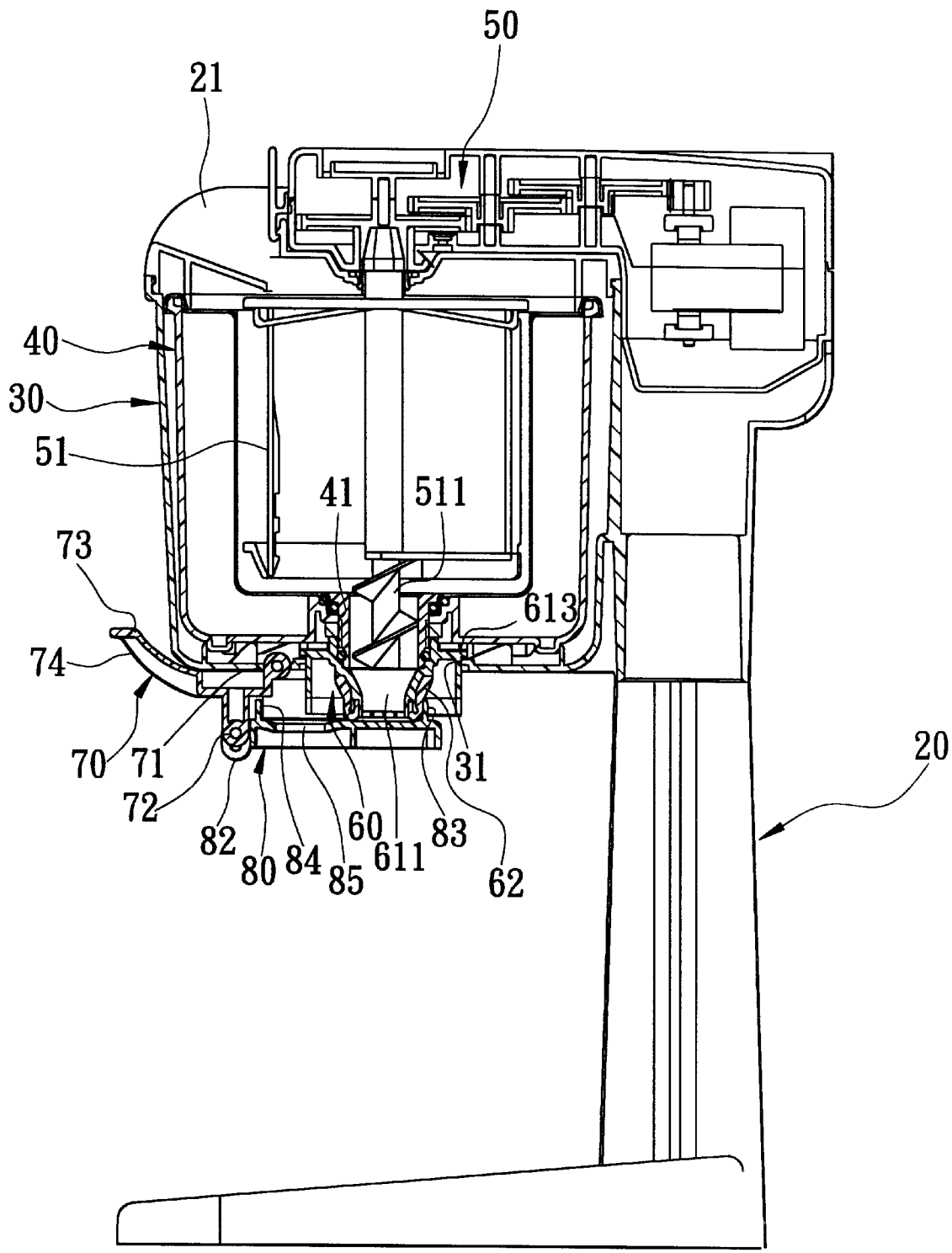
FIG. 4 is a cross-sectional side view of the ice cream making apparatus of FIG. 3 in a closed position.

FIGS. 3 and 4 illustrate an ice cream making apparatus embodying this invention. The ice cream making apparatus of this invention includes a stand 20, an outer container 30 mounted on the stand 20, an inner container 40 received inside the outer container 30, an agitator 51 disposed inside the inner container 40, a cover 21 covering the top of the inner container 40, and a driving unit 50 mounted on the stand 20 and connected to the agitator 51. The inner container 40 has a first bottom opening 41, and the outer container 30 has a second bottom opening 31 aligned with and disposed below the first bottom opening 41. An extruding screw portion 511 extends downwardly from the agitator 51 through the first and second bottom openings 41, 31. A discharging mechanism 100 is mounted on the outer container 30, and includes a hollow guide 60, a gate member 80, and a linkage mechanism 70.

Figure 5:
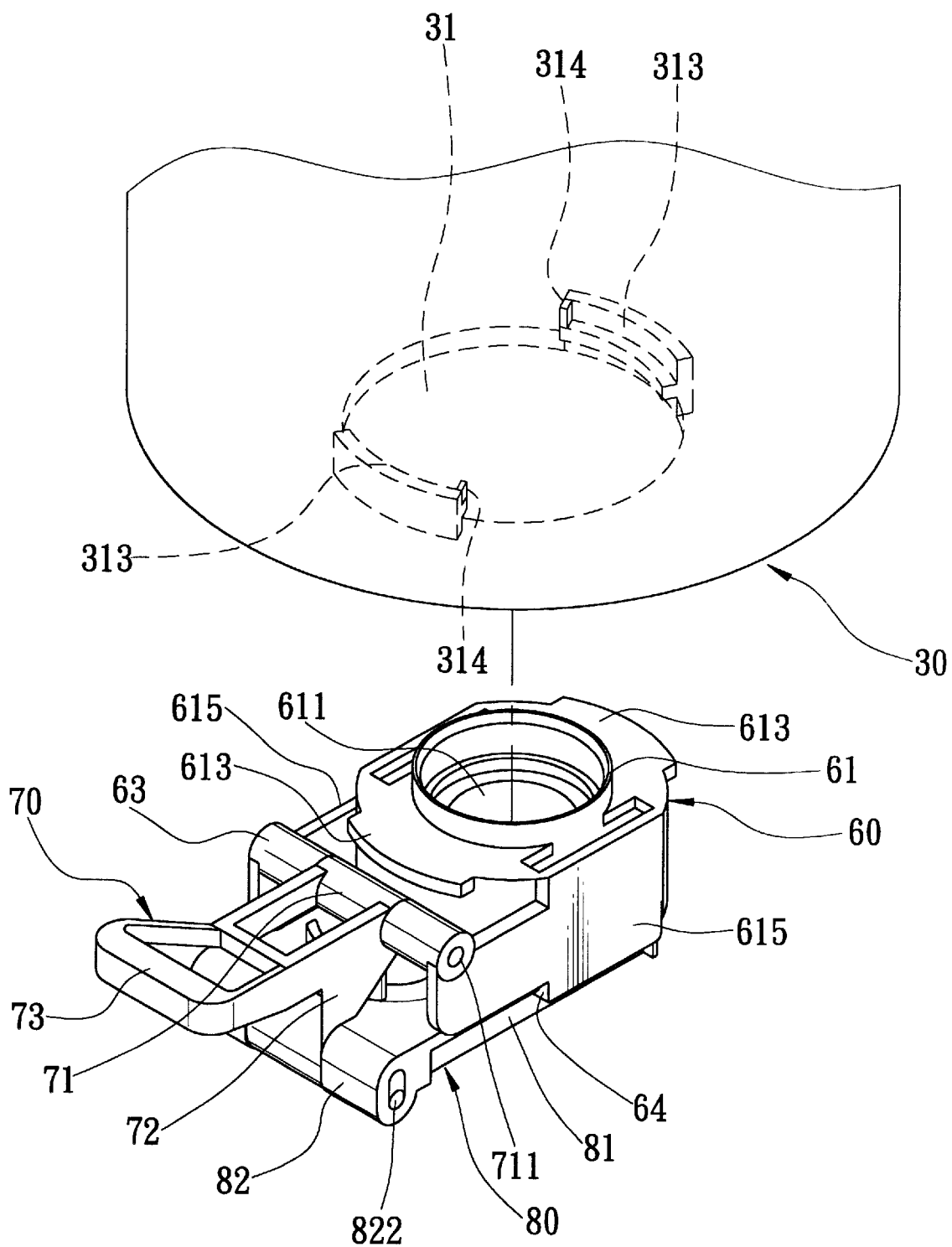
FIG. 5 is a fragmentary exploded view of the ice cream making apparatus of FIG. 3.

Referring now to FIG. 5 in combination with FIGS. 3 and 4, a pair of diametrically opposed L-shaped shoulders 313 are raised uprightly from a bottom side of the outer container 30 and extend circumferentially of the second bottom opening 31. Each shoulder 313 is provided with a stopper 314.

The hollow guide 60 includes a top end 61 extending through the second bottom opening 31, a pair of diametrically opposed necks 613 adjacent to the top end 61, and a tapered bottom end 614 which extends downwardly from the top end 61 and which defines a passageway 611 that communicates the first and second bottom openings 41, 31. A pair of opposing side plates 615 extend downwardly from two opposing sides of the top end 61 of the hollow guide 60, respectively. The side plates 615 are provided with a pair of slide rails 64 and a pair of opposing pivotal hollow first ears 63. The necks 613 are mounted respectively on the shoulders 313 between the stoppers 314, and are confined by the stoppers 314. A sealing member 62 is sleeved around the tapered bottom end 614, and has a hook-shaped end 621 which interlocks with a groove-shaped end 612 of the tapered bottom end 614 via tongue and groove means. The hook-shaped end 621 has a bottom curved surface 622 protruding out of the tapered bottom end 614.

The linkage mechanism 70 includes a lever 74 and a connecting rod 72 extending downwardly from the lever 74. The lever 74 has a hollow first pivotal end 71 disposed between and pivoted to the first ears 63 via a first pin 711 that extends through the first ears 63 and the first pivotal end 71, and a handling end 73 opposite to the first pivotal end 71. The first pin 711 defines an axis (X) which is transverse to the slide rails 64. The connecting rod 72 has one end connected to the lever 74 between the first pivotal end 71 and the handling end 73, and a hollow second pivotal end 721 pivoted to the gate member 80.

The gate member 80 is formed as a plate, and has a pair of opposing slide guides 81 mounted slidably on the slide rails 64. The gate member 80 has two opposing ends, a pair of hollow pivotal second ears 82 formed on one of the two opposing ends, a pair of opposing stoppers 83 raised uprightly from the plate between the two opposing ends, an aperture 85 formed in the plate between the two opposing ends, and a planar part 86 adjacent to and aligned with the aperture 85 in a direction parallel to the slide rails 64. The second pivotal end 721 of the connecting rod 72 is disposed between and is pivoted to the second ears 82 of the gate member 80 via a second pin 822 that extends through the second ears 82 and the second pivotal end 721. The second pin 822 defines an axis that is parallel to the axis (X). A clearance is arranged between the second pin 822 and each second ear 82 for allowing a slight turning movement of the second pin 822 inside the second ears 82. A truncated cone-shaped surface 851 is formed on the gate member 80, and surrounds the aperture 85.

Figure 6:
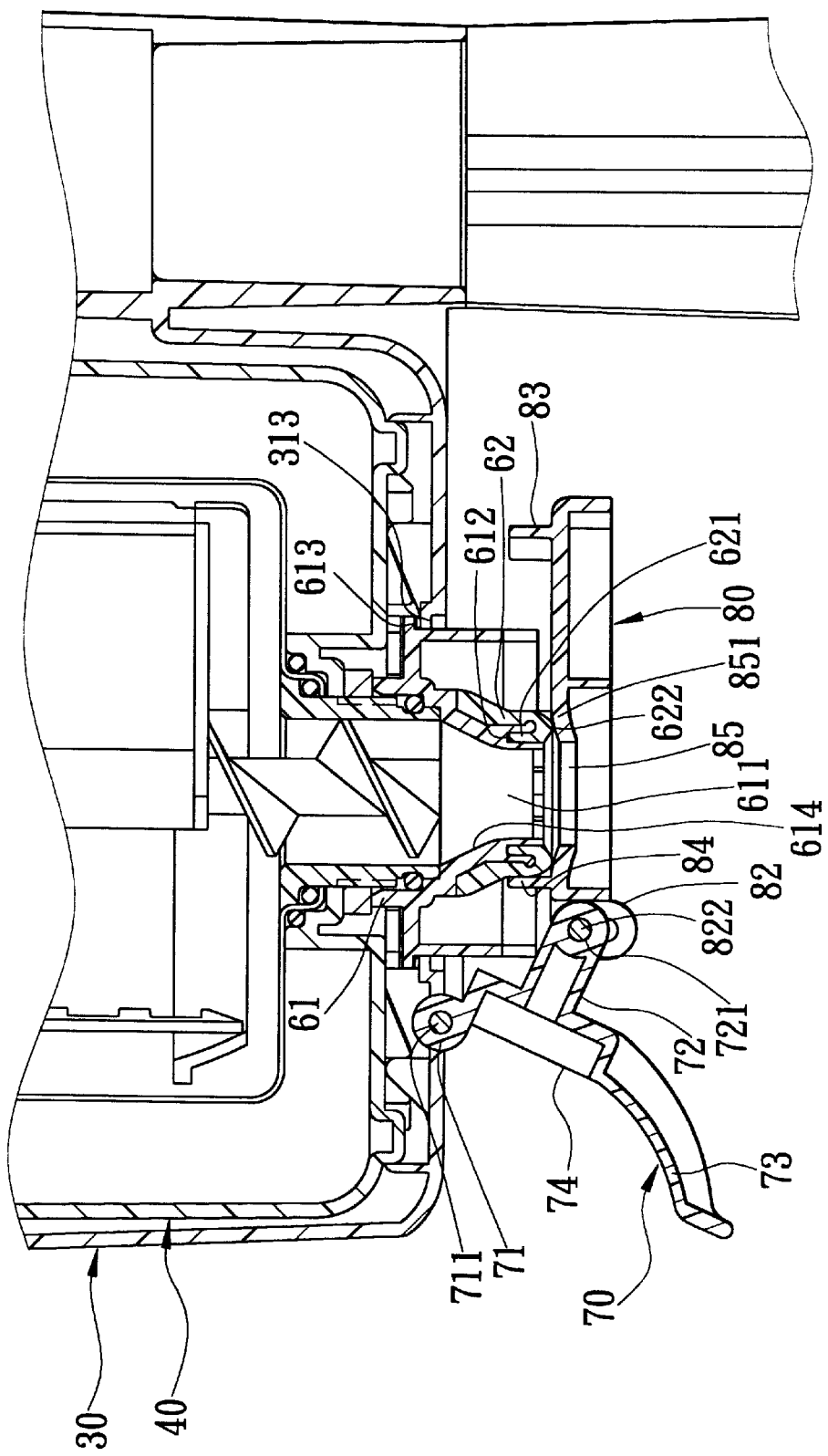
FIG. 6 is a fragmentary cross-sectional side view of the ice cream making apparatus of FIG. 3 in an opened position.

Referring now to FIG. 6 in combination with FIGS. 3 to 5, the gate member 80 is slidable for moving in a transverse direction across the passageway 611 between an opened position in which the aperture 85 is aligned below the passageway 611 when the lever 74 rotates in a counterclockwise direction about the axis (X) and pushes the gate member 80 via the connecting rod 72, and a closed position in which the planar part 86 abuts against the bottom curved surface 622 of the sealing member 62 when the lever 74 rotates in a clockwise direction about the axis (X) and pulls the gate member 80 via the connecting rod 72. The stoppers 83 confine the movement of the gate member 80 to facilitate positioning of the aperture 85 and the planar part 86 upon rotation of the linkage mechanism 70 about the axis (X).

With the invention thus explained, it is apparent that various modifications and variations can be made without departing from the spirit of the present invention. It is therefore intended that the invention be limited only as recited in the appended claims.

I claim:

1. An ice cream making apparatus, comprising:

a container having a first bottom opening for passage of ice cream; and a discharging mechanism mounted on said container below said first bottom opening and adapted to discharge ice cream out of said container, said discharging mechanism having a hollow guide which is mounted on said container and which defines a passageway therein for communication with said first bottom opening, a gate member disposed underneath said passageway and mounted slidably on said hollow guide for moving in a transverse direction across said passageway to seal said passageway, and a linkage mechanism pivotally mounted on said hollow guide for rotating about an axis to manipulate movement of said gate member in said transverse direction.

2. The apparatus of claim 1, wherein said linkage mechanism includes a lever mounted pivotally on said hollow guide, and a connecting rod extending from said lever and connected to said gate member, said gate member being slidable between a closed position in which said passageway is covered sealingly by said gate member, and an opened position in which said passageway is uncovered by said gate member upon rotation of said lever about said axis.

3. The apparatus of claim 2, wherein said lever has a pivot end pivoted to said hollow guide and a handling end opposite to said pivot end, said connecting rod having one end connected to said lever between said pivot end and said handling end, and the other end pivoted to said gate member.

4. The apparatus of claim 3, wherein said hollow guide has a pair of slide rails, said gate member being mounted slidably on said slide rails for moving between said closed and opened positions, said axis being transverse to said slide rails.

5. The apparatus of claim 4, wherein said gate member is formed as a plate, said plate having an aperture and a planar part aligned with said aperture in a direction the same as said transverse direction, said aperture being aligned with said passageway when said gate member moves to said opened position, said planar part abutting against said hollow guide when said gate member moves to said closed position.

6. The apparatus of claim 5, wherein said hollow guide has a top end, a tapered bottom end which extends downwardly from said top end and which defines said passageway, and a sealing member sleeved around said tapered bottom end, said sealing member having a bottom curved surface in sliding contact with said planar part so as to provide a seal between said gate member and said hollow guide.

7. The apparatus of claim 6, further comprising a stand; a driving unit mounted on said stand; a shaft disposed inside said container and connected to said driving unit for agitating ice cream; and an extruding screw portion extending downwardly from a bottom end of said shaft through said first bottom opening, said container having an outer container mounted on said stand, and an inner container surrounded by said outer container, said outer container having a second bottom opening aligned with and disposed below said first bottom opening and a pair of opposing shoulders extending circumferentially of said second bottom opening, said hollow guide having a pair of opposing necks mounted securely on said shoulders.

\* \* \* \* \*